United States Patent
Hayashi

(10) Patent No.: US 6,717,531 B2
(45) Date of Patent: Apr. 6, 2004

(54) KEYBOARD DEVICE AND A METHOD OF CONTROLLING A POWER SUPPLY INCORPORATED IN THE KEYBOARD DEVICE

(75) Inventor: Keiichi Hayashi, Kanagawa (JP)

(73) Assignee: NEC Corporation, Tokyo (JP)

( * ) Notice: Subject to any disclaimer, the term of this patent is extended or adjusted under 35 U.S.C. 154(b) by 309 days.

(21) Appl. No.: 09/761,586

(22) Filed: Jan. 18, 2001

(65) Prior Publication Data
US 2001/0009401 A1 Jul. 26, 2001

(30) Foreign Application Priority Data
Jan. 21, 2000 (JP) ......................... 2000-017750

(51) Int. Cl.[7] ................ H03K 17/94; H03M 11/00
(52) U.S. Cl. ................. 341/22; 455/556.2; 361/686; 400/717
(58) Field of Search .................. 341/22; 455/556.2, 455/557, 572, 573, 574; 361/683, 686; 400/717

(56) References Cited

U.S. PATENT DOCUMENTS

| | | | |
|---|---|---|---|
| 4,799,254 A | * 1/1989 | Dayton et al. | ........... 379/93.26 |
| 5,065,360 A | 11/1991 | Kelly | |
| 5,410,305 A | 4/1995 | Barrus et al. | |
| 5,625,673 A | * 4/1997 | Grewe et al. | ............ 455/556.2 |
| 5,841,424 A | * 11/1998 | Kikinis | ........................ 345/168 |
| 5,861,822 A | 1/1999 | Park et al. | |
| 5,907,815 A | * 5/1999 | Grimm et al. | ............... 455/557 |
| 6,108,200 A | * 8/2000 | Fullerton | ..................... 361/686 |
| 6,542,092 B1 | * 4/2003 | Pan | .............................. 341/22 |
| 2001/0021659 A1 | * 9/2001 | Okamura | ..................... 455/557 |
| 2001/0039195 A1 | * 11/2001 | Nickum | ....................... 455/557 |
| 2002/0163778 A1 | * 11/2002 | Hazzard et al. | ............. 361/683 |
| 2002/0169001 A1 | * 11/2002 | Itazawa | ....................... 455/557 |

FOREIGN PATENT DOCUMENTS

| | | |
|---|---|---|
| EP | 0472261 A2 | 8/1991 |
| EP | 0472261 A3 | 8/1991 |
| EP | 0 567 957 A | * 4/1993 |
| JP | 02-238512 | 9/1990 |
| JP | 02-294720 | 12/1990 |
| JP | 5011891 | 1/1993 |
| JP | 09-16303 | 1/1997 |
| JP | P2000-1397 | 1/2000 |

* cited by examiner

Primary Examiner—Timothy Edwards
(74) Attorney, Agent, or Firm—Whitham, Curtis & Christofferson, PC

(57) ABSTRACT

A keyboard device incorporating a power supply checks whether or not the power supply is turned on. If it is, the device determines whether or not the device is connected to a cellular phone. If the connection is determined, the keyboard device is set to an active state and a light emitting diode (LED) in an LED portion is turned on to indicate the active state. If the keyboard device is not connected to the cellular phone, the device is set to a standby state. In this state, the keyboard device is in a mode where a connection state with respect to a cellular phone is monitored, without turning on the LED. The power dissipated in the power supply of the keyboard device is minimized, thus the device is capable of operating for a long period of time.

12 Claims, 3 Drawing Sheets

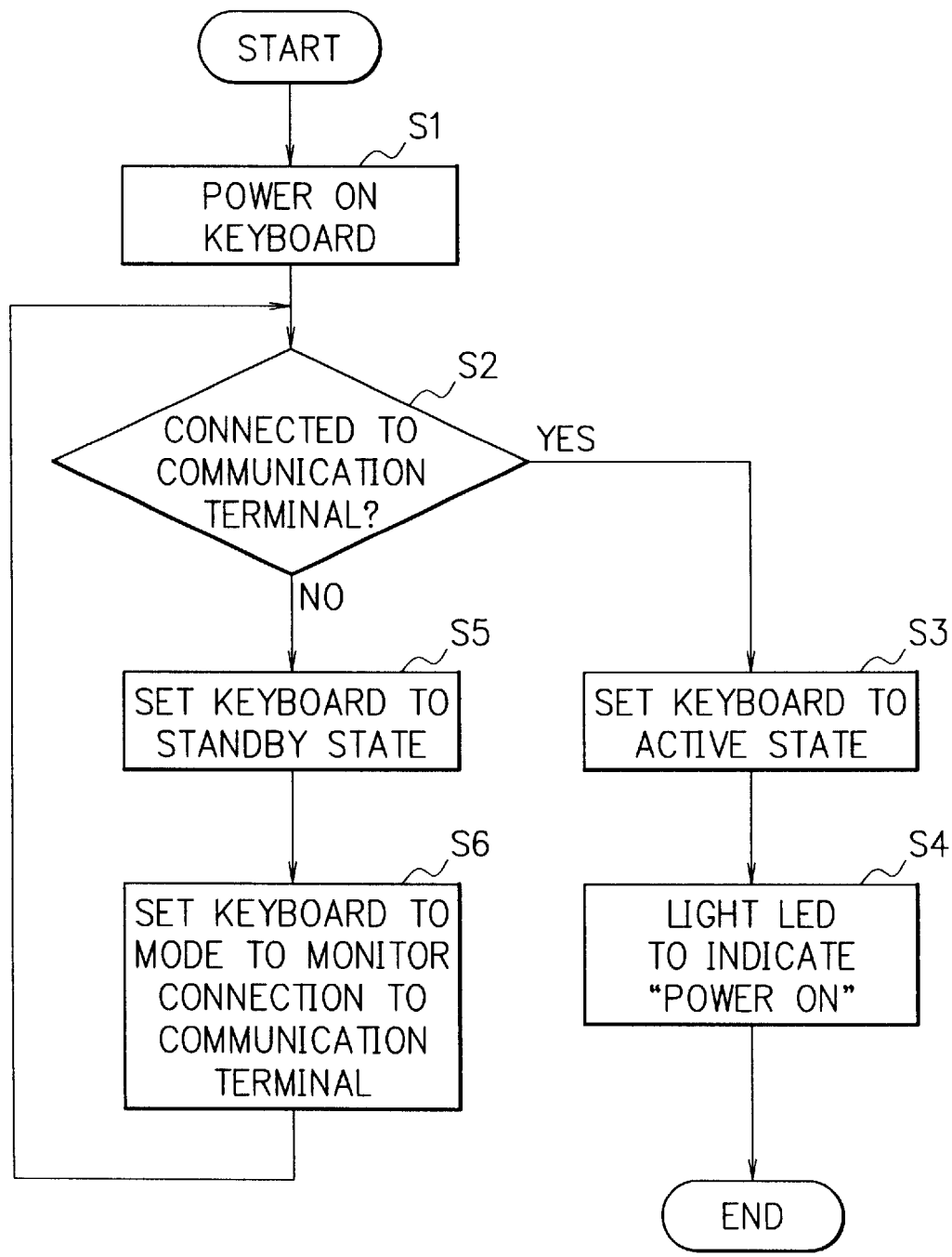

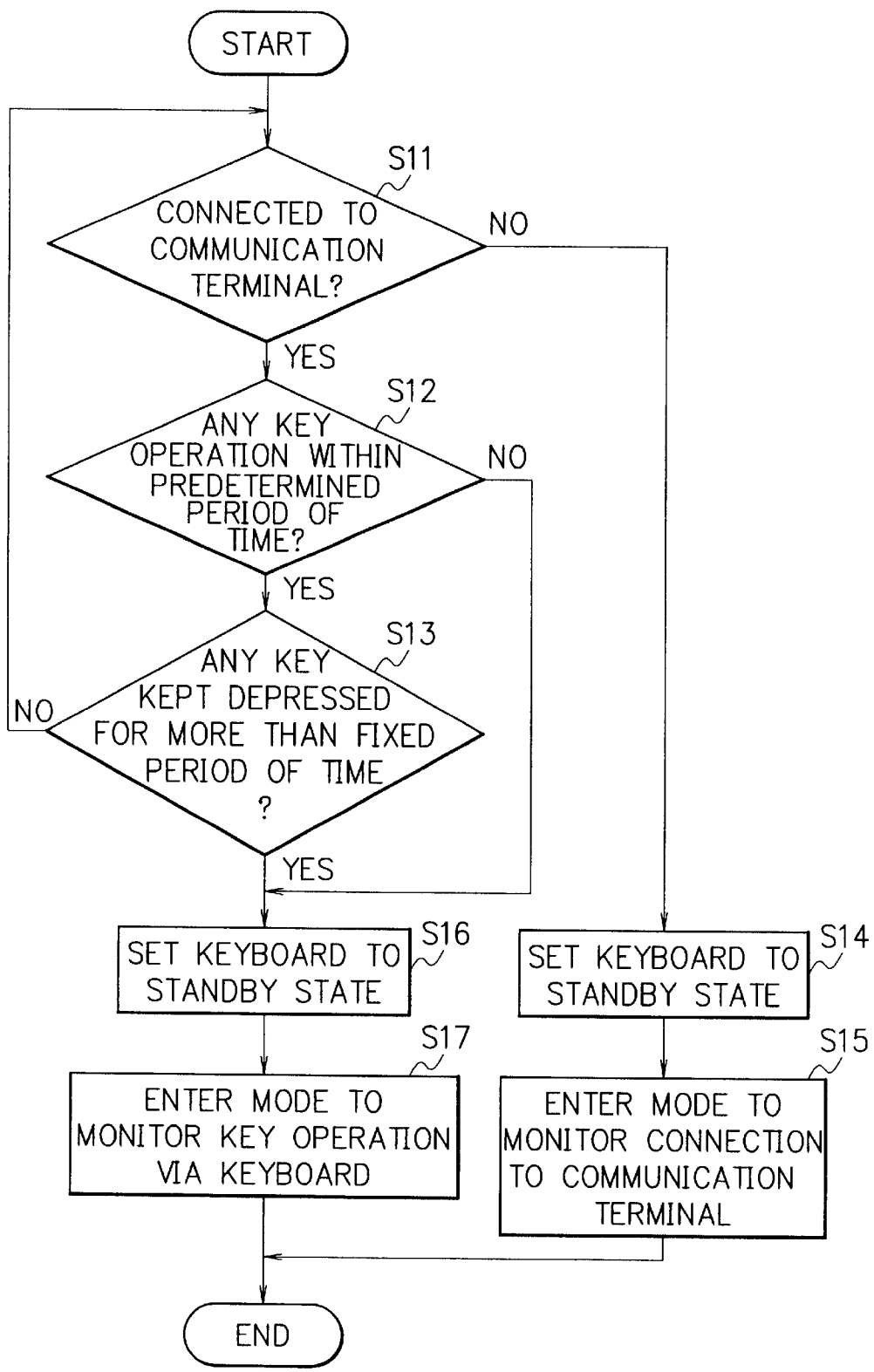

KEYBOARD DEVICE AND A METHOD OF CONTROLLING A POWER SUPPLY INCORPORATED IN THE KEYBOARD DEVICE

BACKGROUND OF THE INVENTION

The present invention relates to a keyboard device and a method of controlling a power supply internally incorporated in the keyboard device. More particularly, the present invention relates to a keyboard device which is connected in operation to an external device such as a communication terminal including a personal computer, a portable telephone or the like, and to a method of controlling the power supply of the keyboard device.

DESCRIPTION OF THE PRIOR ART

With the increase in the number of users who performs communications or exchange data by means of an electronic mail via a portable or cellular telephone as a communication terminal, the users increasingly encounter occasions to enter characters and letters via the telephone. When a conventional cellular phone is used to enter characters, successive key operations are required for the user, imposing a troublesome burden on the user.

To support or facilitate operability of the cellular phone, an external keyboard device is known which is connected via a cable to a cellular phone or the like, to receive the power from that phone. The keyboard device of this type does not incorporate its own power supply. Likewise, as for the keyboard device used to connect to a personal computer, operating power is supplied from the computer itself.

In the conventional keyboard device of the personal computer or the cellular phone, once the power switch provided in the keyboard device is turned on, then the power supplied from the personal computer or cellular phone is dissipated by the device.

This may in some cases cause a problem that, when the user tries to send a message or mail to the designated destination after entering desired characters via the keyboard device, the power in the power supply required to send the electronic mail has become insufficient.

To overcome the drawbacks, there has been proposed a keyboard device which incorporates its own power supply, from which the device operates. This power supply is completely independent of the power supply used to operate the personal computer or the cellular phone. In the keyboard device, the power required when the user enters characters is supplied from the power supply incorporated in the device itself. The keyboard device is usually connected to the personal computer or the cellular phone, only when a message is sent via the electronic mail. In this case, the power supply equipped in the personal computer or the cellular phone is the source of power used when entering characters.

As for a keyboard device of another type, one which is used by directly inserting a part of the cellular phone into the keyboard device, is also known as a keyboard device of slot-in type.

However, the above-mentioned keyboard devices relating to the prior art internally incorporate their own power supply, therefore, when the power switch provided in the devices is turned on, the devices dissipate the power, regardless of whether or not the devices are connected to the personal computer or the cellular phone. This disadvantageously reduces the operable time of the keyboard device.

When the conventional keyboard device is put in a bag or the like, under a condition of being connected to the personal computer or the cellular phone, the power to the personal computer or the cellular phone is undesirably turned on in some cases. To prevent such a trouble, a hard box is provided to reside the keyboard device. In some cases, to prevent undesired operation of the keyboard device or the like which will occur when a particular key on the keyboard device is kept depressed, a cover unit is provided to protect the keys.

SUMMARY OF THE INVENTION

The present invention has been made considering the above-mentioned problems. It is an object of the present invention to provide a keyboard device capable of controlling efficiently its own internal power supply. It is an another object of the present invention to provide a method of controlling the power supply internally incorporated in the keyboard device, for allowing to reduce the power dissipation in the device.

In accordance with the present invention, there is provided a keyboard device which is internally incorporating a power supply, said device comprising: a first monitor means for monitoring a connection state of said keyboard device with respect to an external device; and a control means for controlling a state of said power supply in accordance with said connection state obtained by said first monitor means.

It is preferable that said control means performs control to set said keyboard device to an active state, if said first monitor means monitors to determine a connection between said keyboard device and said external device.

It is preferable that said control means performs control to set said keyboard device to a standby state, if said first monitor means fails to determine a connection between said keyboard device and said external device.

It is also preferable that the present invention further comprises a second monitor means for monitoring a key operation, wherein said control means performs control to set said keyboard device to a standby state, if said second monitor means determines that there is no key operation for more than a predetermined period of time.

Preferably, said control means performs control to set said keyboard device to a standby state, if said second monitor means determines that any key is kept depressed for more than a predetermined period of time.

Preferably, said external device is a communication terminal.

In accordance with another aspect of the present invention, there is provided a method of controlling a power supply internally incorporated in a keyboard device, comprising: a first monitoring step of monitoring a connection state of said keyboard device with respect to an external device; and a step of controlling a state of said power supply in accordance with said connection state obtained in said first monitoring step.

It is preferable that the method of controlling a power supply according to the present invention, said keyboard device is so controlled in said controlling step that the device is set to an active state, if it is determined in said first monitoring step that a connection has been made between said keyboard device and said external device.

It is also preferable that the method of the present invention, said keyboard device is so controlled in said controlling step that the device is set to a standby state, if it is determined in said first monitoring step that no connection has been made between said keyboard device and said external device.

It is also preferable that the method according to the present invention further comprises a second monitoring step of monitoring a key operation, wherein in said controlling step, said keyboard device is so controlled that the device is set to a standby state, if it is determined in said second monitoring step that there is no key operation for more than a predetermined period of time.

In accordance with the present invention method, said keyboard device is so controlled in said controlling step that the device is set to a standby state, if it is determined in said second monitoring step that any key has been kept depressed for more than a predetermined period of time.

Preferably, in the method according to the present invention, said external device is a communication terminal.

BRIEF DESCRIPTION OF THE DRAWINGS

The objects and features of the present invention will become more apparent from the consideration of the following detailed description taken in conjunction with the accompanying drawings in which:

FIG. 3 is a flowchart showing a first operation of a keyboard device according to an embodiment of the present invention; and FIG. 4 is a flowchart showing a second operation of a keyboard device according to an embodiment of the present invention.

DESCRIPTION OF THE PREFERRED EMBODIMENTS

Referring to the accompanied drawings, description will now be given in detail of a keyboard device according to an embodiment of the present invention. With reference to FIGS. 1 to 4, detailed explanation of a keyboard device in accordance with an embodiment of the present invention will be given.

Figure 1:
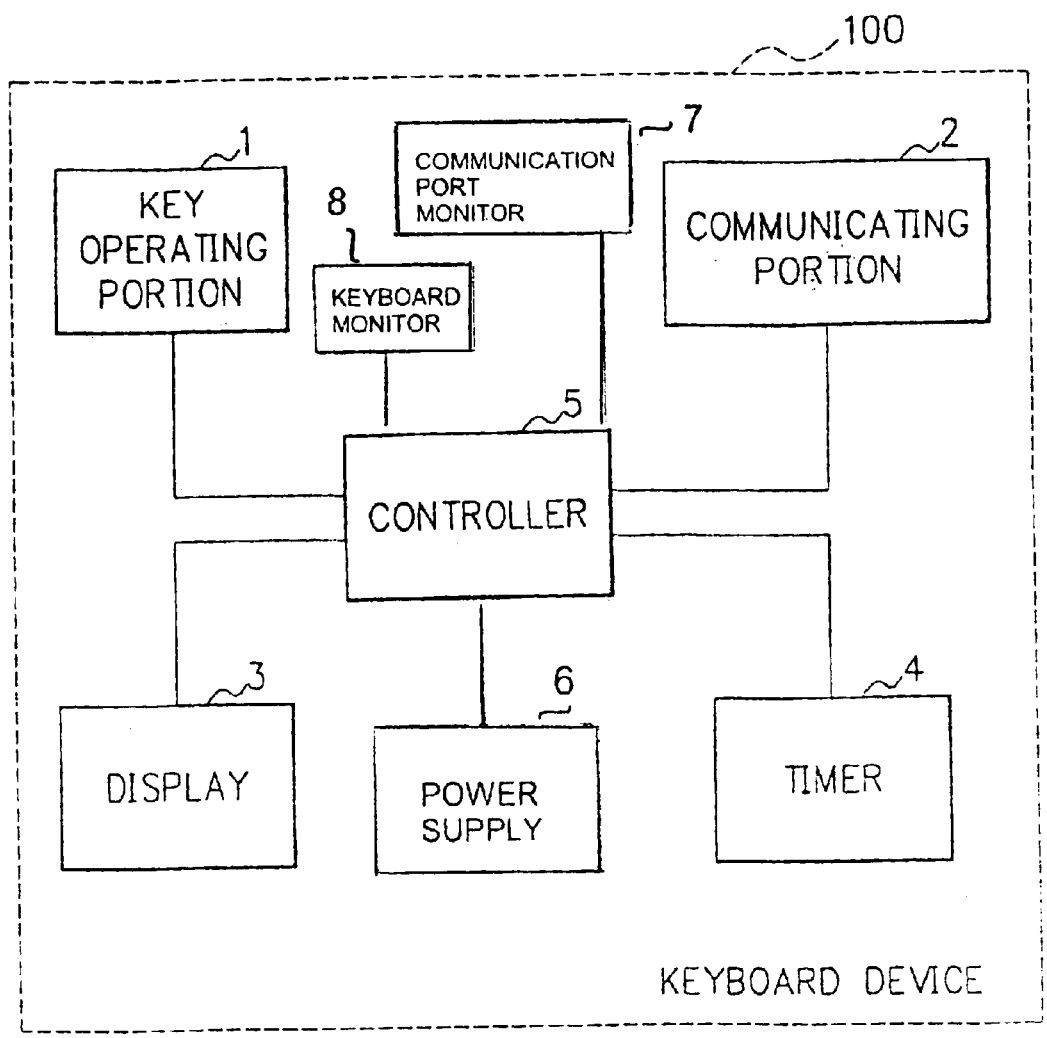
FIG. 1 is a block diagram schematically showing a configuration of a keyboard device according to an embodiment of the present invention.

FIG. 1 is a block diagram schematically showing a constitution of a portable communication unit ancillary keyboard device according to present invention. As shown in FIG. 1, a portable communication unit ancillary keyboard device 100 includes a key operating portion 1, a communication portion 2, a display portion 3, a timer 4, a control portion 5, a power supply 6, a communication port monitor 7, and a keyboard monitor 8.

The key operating portion 1 has a plurality of enter keys (not shown) arranged for the user to input his/her desired information related to characters and information with respect to destination.

The communication portion 2 is a part which establishes a connection to an external communication terminal. The control portion 5 determines, via the communication portion 2, as to whether a personal computer or a cellular phone which serves as a communication terminal is connected to the keyboard device 100.

The display portion 3 includes, for example, light emitting diode(s) (LED) (not shown). The LED is lit or unlit depending on a state of the keyboard device 100, i.e., an active state or a standby state.

The timer 4 measures or monitors a state during which no operation is made by the user with respect to the keyboard device 100, or any key is kept depressed. More specifically, the timer 4 measures elapsed time in which no key operation is done to the keyboard device 100 for more than a predetermined period of time, or in which any one or more of the keys is kept depressed for more than a fixed period of time.

The controller 5 controls a power supply internally incorporated in the keyboard device 100. The controller 5 sets the power supply to an active state or a standby state (in other words, a power saving mode), depending upon how the key operating portion 1 is operated by the user or connection state of the keyboard device 100 via the communication portion 2.

Figure 2:
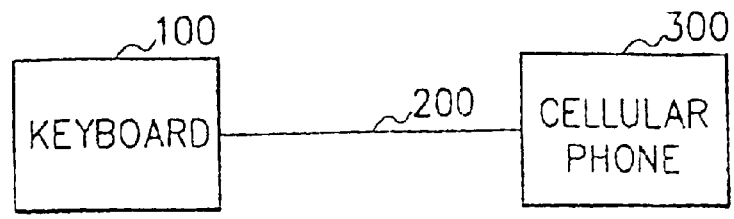
FIG. 2 schematically shows configuration of usage of a keyboard device according to an embodiment of the present invention.

FIG. 2 shows one of configurations of usage with respect to the keyboard device 100 according to the present invention. By way of example, as shown in FIG. 2, the keyboard device 100 is in use under the condition of being connected via a cable 200 to a cellular phone 300 which serves as a communication terminal. Transmission information comprising data associated with characters, numerals, symbols or the like entered by using the keyboard device 100, is sent via the cable 200 to the cellular phone 300.

In the present embodiment, it is illustrated that the keyboard device 100 is connected to the cellular phone 300. However, the keyboard device 100 may also be connected to a personal computer which accommodates a telephone line.

FIG. 3 is a flowchart depicting a first operation of the keyboard device 100 according to the present embodiment. In step S1 of the flowchart, the keyboard device 100 determines whether or not the power has been introduced to the device itself. If it is (i.e., the power is ON), the device checks in step S2 via the communication portion 2, if the device is connected to the communication terminal.

If it is determined that the keyboard device 100 is connected to the communication terminal (YES in step S2), the device is set to an active state in step S3. In the next step, step S4, the LED is lit indicating that the keyboard device 100 is in the active state, that is, the power supply internally incorporated in the device has been turned on.

If it is determined that the keyboard device is not connected to the communication terminal (NO in step S2), the device is set to a standby state in step S5. The device is then set to a mode where the LED remains unlit for indicating that the device is in an inactive state and at the same time, a connection state of the device with respect to the communication terminal is monitored (step S6).

According to the first operation as described above, the keyboard device 100 becomes an active state only when the internal power supply is turned on and the connection to the communication terminal is determined. However, even when the power supply is turned on and no connection can be determined with respect to the communication terminal, the device remains a standby state.

FIG. 4 is a flowchart illustrating a second operation of the keyboard device 100. As an example of the second operation, it is considered that the keyboard device 100 is put in a bag or the like, when the device is under the condition of being connected to a communication terminal.

In step S11 of the flowchart shown in FIG. 4, the keyboard device 100 checks via the communication portion 2, if the device is connected to the communication terminal.

If it is determined that the keyboard device 100 is not connected to the communication terminal (NO in step S11), the device is set to a standby state in step S14. The device is then set, in step S15, to a mode where a connection state of the device with respect to the communication terminal is monitored.

Alternatively, if it is checked in step 11 that the keyboard device 100 is connected to the communication terminal, confirmation is made in step S12 whether or not any key operation has been conducted by using the key operating portion 1 within a predetermined period of time.

If it is determined in step 12 that there has been no key operation within a predetermined period of time, the process goes to step S16 where the keyboard device 100 is set to a standby state. In the next step, step S17, the device starts monitoring a key operation conducted via the key operating portion 1.

If YES is rendered in step 12, (that is, it is determined that a key operation is accomplished within a predetermined period of time), check is made in step S13 whether or not any key has been kept depressed for more than a predetermined period of time.

If any key is found to be kept depressed for more than a fixed period of time (YES in step S13), the keyboard device 100 is set to a standby state in step S16. Therefore, in step S17, as mentioned above, the device enters into the mode to monitor a key operation executed by using the key operating portion 1.

On the other hand, if it is found that any key is not kept depressed for more than a predetermined period of time (NO in step S13), the controller 5 determines that the user is now operating the keyboard device 100. The process then returns to step S11 and repeats the same as mentioned above while keeping the state of the device to be active.

According to the example described as the second operation, if it is detected that any key has been kept depressed for more than a predetermined period of time when the keyboard device 100 is in an active state, the internal power supply of the device is set to a standby state.

The embodiment as discussed above is a preferred one according to the present invention. It can therefore be modified or changed within a scope of the present invention. For example, the state of the power supply may be controlled in conformity with an opening or closing operation with respect to the housing of the keyboard device. This facilitates an easy access to communication sites which are frequently accessed by the user.

As set above, the keyboard device including its power supply according to the present invention, is so controlled that the device is set to an active state only when the device is connected to an external equipment serving as a communication terminal. Therefore, even the power supply internally incorporated in the keyboard device is set to an "power-on" state and left as it is, the power dissipated in the keyboard device can be minimized.

Moreover, according to the keyboard device with an internal power supply and a method of controlling the power supply of the present invention, a state in which any key on the device has been kept depressed for more than a predetermined period of time, is monitored when the keyboard device is put, for example, in a bag or the like, and a mode with respect to the power supply is changed accordingly. It is therefore possible to minimize the power consumed in the keyboard device, thus providing the device capable of being used for longer hours to which the power is supplied by batteries.

Additionally, it is also possible to prevent unnecessary transmission of key codes from the keyboard device to a mobile unit. This advantageously precludes an erroneous operation of the mobile unit.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A portable communication unit ancillary keyboard device internally incorporating a power supply, comprising:
    a dedicated power supply contained within said portable communication unit ancillary keyboard device,
    a first monitor means for monitoring a connection state of said portable communication unit ancillary keyboard device with respect to an external device; and
    a control means for controlling a state of said power supply in accordance with said connection state obtained by said first monitor means.

2. The portable communication unit ancillary keyboard device according to claim 1, wherein said control means performs control to set said portable communication unit ancillary keyboard device to an active state, if said first monitor means monitors to determine a connection between said portable communication unit ancillary keyboard device and said external device.

3. The portable communication unit ancillary keyboard device according to claim 1, wherein said control means performs control to set portable communication unit ancillary keyboard device to a standby state, if said first monitor means fails to determine a connection between said keyboard and said external device.

4. The portable communication unit ancillary keyboard device according to claim 2, wherein further comprising a second monitor means for monitoring a key operation, wherein:
    said control means performs control to set said portable communication unit ancillary keyboard device to standby state, if said second monitor means determines that there is not key operation for more than a predetermined period of time, and
    said control means sets display LED to indicate standby mode.

5. The portable communication unit ancillary keyboard device according to claim 4, wherein:
    said control means performs control to set said portable communication unit ancillary keyboard device to a standby state, if said second monitor means determines that any key is kept depressed for more than a predetermined period of time, and
    said control means sets display LED to indicate standby mode.

6. The portable communication unit ancillary keyboard device according to claim 5, wherein said external device is a communication terminal.

7. A method of controlling a power supply internally incorporated in a portable communication unit ancillary keyboard device, comprising:
    a first monitoring step of monitoring a connection state of said portable communication unit ancillary keyboard device with respect to an external device; and
    a step of controlling a state of said power supply in accordance with said connection state obtained in said first monitoring step.

8. The method of controlling a power supply according to claim 7, wherein in said controlling step, said portable communication unit ancillary keyboard device is so controlled that the device is set to an active state, if it is determined in said first monitoring step that a connection has been made between said portable communication unit ancillary keyboard device and said external device.

9. The method of controlling a power supply according to claim 7, wherein in said controlling step, said portable communication unit ancillary keyboard device is so controlled that the device is set to standby state, if it is determined in said first monitoring step that no connection has been made between said portable communication unit ancillary keyboard device and said external device.

10. The method of controlling a power supply according to claim 8, further comprising a second monitoring step of monitoring a key operation, wherein in said controlling step, said portable communication unit ancillary keyboard device is so controlled that the device is set to a standby state, if it is determined in said second monitoring step that there is no key operation for more than a predetermined period of time, and said display is so controlled that it indicates standby mode.

11. The method of controlling a power supply according to claim 10, wherein in said controlling step, said portable communication unit ancillary keyboard device is so controlled that the device is set to a standby state, if it is determined in said second monitoring step that any key has been kept depressed for more than a predetermined period of time, and said display is so controlled that it indicates standby mode.

12. The method of controlling a power supply according to claim 11, wherein said external device is a communication terminal.

\* \* \* \* \*